United States Patent
Cole et al.

(10) Patent No.: US 7,535,826 B1
(45) Date of Patent: May 19, 2009

(54) ROUTING PROTOCOLS FOR ACCOMMODATING NODES WITH REDUNDANT ROUTING FACILITIES

(75) Inventors: Bruce Cole, San Francisco, CA (US); Anthony Joseph Li, San Mateo, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 789 days.

(21) Appl. No.: 10/014,323

(22) Filed: Dec. 10, 2001

Related U.S. Application Data (60) Provisional application No. 60/254,593, filed on Dec. 11, 2000.

(51) Int. Cl.
*G01R 31/08* (2006.01)

(52) U.S. Cl. .................................. 370/218; 370/255

(58) Field of Classification Search ............... 370/216, 370/217, 218, 219, 220, 221, 225, 254, 255
See application file for complete search history.

(56) References Cited

U.S. PATENT DOCUMENTS

| | | | | |
|---|---|---|---|---|
| 6,049,524 | A | * | 4/2000 | Fukushima et al. .......... 370/220 |
| 6,347,085 | B2 | * | 2/2002 | Kelly .......................... 370/352 |
| 6,577,634 | B1 | * | 6/2003 | Tsukakoshi et al. ..... 370/395.31 |
| 6,590,867 | B1 | * | 7/2003 | Ash et al. .................... 370/236 |
| 6,751,188 | B1 | * | 6/2004 | Medved et al. .............. 370/216 |
| 6,885,635 | B1 | * | 4/2005 | Haq et al. .................... 370/219 |
| 7,002,905 | B1 | * | 2/2006 | Khouri et al. ............... 370/216 |
| 7,031,252 | B1 | * | 4/2006 | Hosler et al. ................ 370/217 |
| 2002/0021675 | A1 | * | 2/2002 | Feldmann .................... 370/254 |
| 2002/0191547 | A1 | * | 12/2002 | Akyol et al. ................. 370/252 |

* cited by examiner

*Primary Examiner*—Ricky Ngo
*Assistant Examiner*—Christine Ng
(74) *Attorney, Agent, or Firm*—Straub & Pokotylo; John C. Pokotylo

(57) ABSTRACT

Graceful restart in routers having redundant routing facilities may be accomplished by replicating network (state/topology) information.

11 Claims, 10 Drawing Sheets

ROUTING PROTOCOLS FOR ACCOMMODATING NODES WITH REDUNDANT ROUTING FACILITIES

§ 0. RELATED APPLICATIONS

Benefit is claimed, under 35 U.S.C. § 119(e)(1), to the filing date of provisional patent application Ser. No. 60/254,593, entitled "ROUTING PROTOCOLS FOR ACCOMMODATING NODES WITH REDUNDANT ROUTING FACILITIES", filed on Dec. 11, 2000 and listing Bruce Cole as the inventor, for any inventions disclosed in the manner provided by 35 U.S.C. § 112, ¶1. This provisional application is expressly incorporated herein by reference.

§ 1. BACKGROUND OF THE INVENTION

§ 1.1 Field of the Invention

The present invention concerns routing protocols. In particular, the present invention concerns routing protocols for use in networks employing at least some nodes having redundant routing facilities.

§ 1.2 Description of Related Art

The description of art in this section is not, and should not be interpreted to be, an admission that such art is prior art to the present invention.

Many large networks are made up of interconnected nodes (referred to as "routers" below without loss of generality). The routers may be geographically distributed throughout a region and connected by links (e.g., optical fiber, copper cable, wireless transmission channels, etc.). In such a network, each router typically interfaces with (e.g., terminates) multiple input links and multiple output links. Addressed data (referred to as "packets" below without loss of generality) traverse the network by being forwarded from router to router until they reach their destinations (as typically specified in by so-called layer-3 addresses in the packet headers). Unlike nodes in a "circuit-switched" network, which establish a connection for the duration of a "call" or "session" to send data received on a given input port out on a given output port, routers determine the destination addresses of received packets and, based on these destination addresses, determine, in each case, the appropriate output link on which to send them. Since, unlike nodes in a "circuit-switched" network, routers are not connection-based, packets having the same destination address may actually traverse different paths through the network.

Basically, known routing protocols function to (i) accept network state information, (ii) update resident network topology information based on such accepted information, (iii) disseminate network state information, (iv) generate paths (e.g., routes) based on the resident network topology information, and (v) generate forwarding information based on the paths. Changes to the network are propagated throughout the network, and nodes of the network will update their resident network topology information accordingly. Such a change to the network may occur when a node fails. Many of such failures are attributable to software failures. As nodes fail and subsequently recover, such changes will be propagated through the network. Depending upon the size of the network, the topology of the network, and signaling used within the network, it may take some time following a change before the network or a node thereof reaches a stable state.

§ 2. SUMMARY OF THE INVENTION

The present invention may be used to effect at least a part of a routing protocol between two nodes, at least one of which including redundant routing facilities. Basically, in one embodiment, the present invention converts each router to router peering session to a one to N peering session, where N is the number of redundant routing engines. In another embodiment, (i) active and standby routing engines share system identifiers and SNPAs, (ii) standby routing engine(s) runs a routing protocol, but certain messages are suppressed, (iii) standby routing engine(s) may form partial adjacencies with remote nodes (e.g., receive, but don't give network information), (iv) the designated routing engine floods its database information to the standby routing engine(s), and (v) the standby routing engine(s) accept link state packets with its system identifier.

§ 4. DETAILED DESCRIPTION

The present invention involves novel methods, apparatus and data structures for effecting at least a part of a routing protocol between two nodes, at least one of which includes redundant routing facilities. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the described methods, apparatus and data structures and any other patentable subject matter.

In the following, an exemplary environment in which the present invention may operate is described in § 4.1. Then, functions that may be performed by the present invention are introduced in § 4.2. Then, exemplary operations, apparatus, methods and data structures that may be used to effect those functions are described in § 4.3. Examples of operations of an exemplary embodiment of the invention are then provided in § 4.4. Finally, some conclusions regarding the present invention are set forth in § 4.5.

§ 4.1 ENVIRONMENT IN WHICH THE PRESENT INVENTION MAY OPERATE

§ 4.1.1 Exemplary Network Environment

Figure 1:
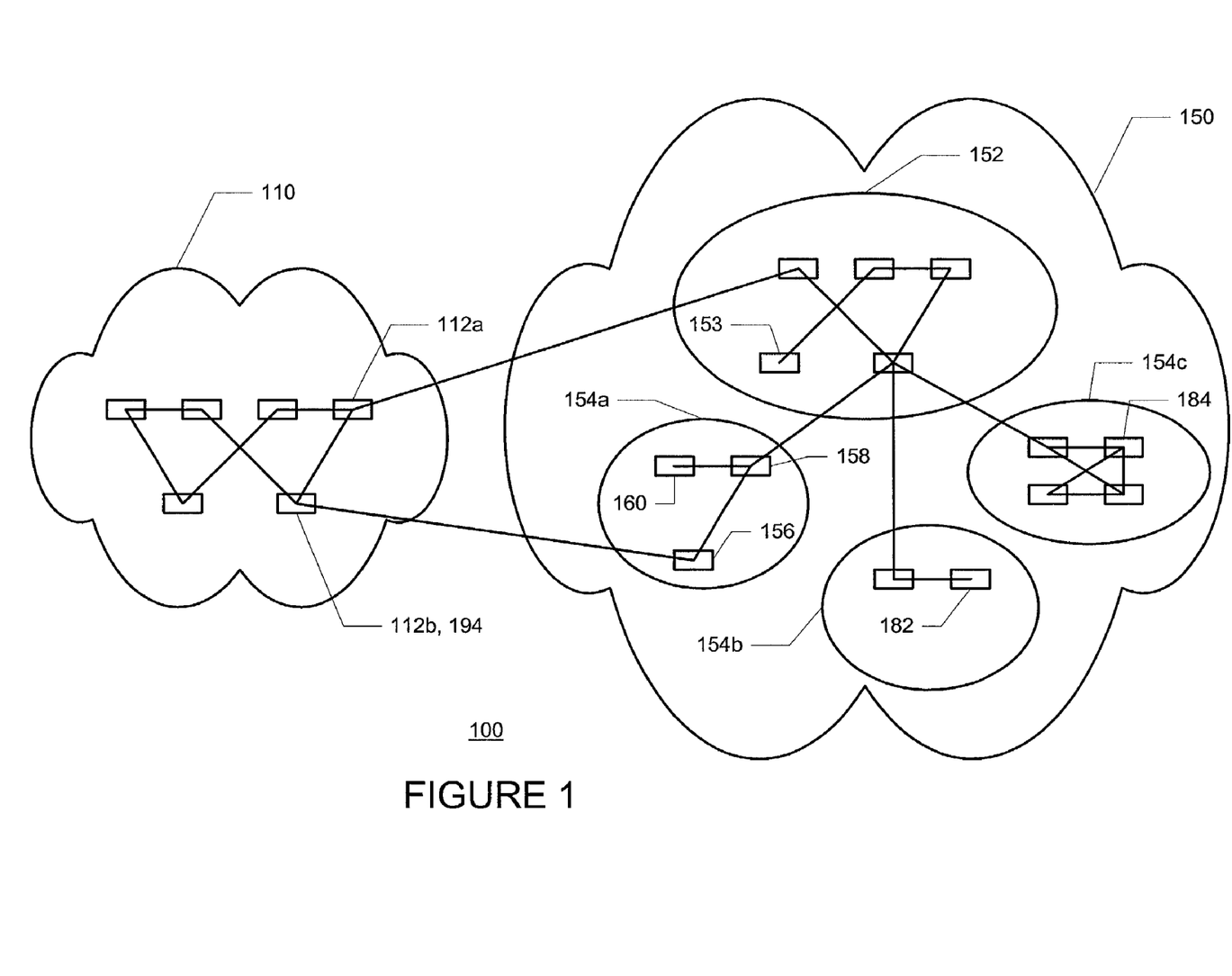
FIG. 1 is a high-level diagram that illustrates an internet in which the present invention may be used.

FIG. 1 illustrates an internet in which the present invention may be used. As illustrated in FIG. 1, an internet 100 may be viewed as a number of sub-networks or "autonomous systems" (also referred to as "AS") 110, 150. Different entities may own and/or operate different autonomous systems. A routing algorithm for use within an autonomous system is called an "interior gateway protocol" (or "IGP"), while a routing algorithm for use between autonomous systems is called an "exterior gateway protocol". Known interior gateway protocols have been classified as distance vector routing protocols (e.g., the "routing information protocol" (or "RIP")), and link state protocols (e.g., the "open shortest path first" (or "OSPF") protocol and the "intermediate system-to-intermediate system" (or "IS-IS") protocol). Known exterior gateway protocols include the "border gateway protocol" (or "BGP"), which is a path vector routing protocol.

Some autonomous systems (ASes) may become quite large, and their management may become quite complex. In such instances, hierarchical routing techniques may be used to define the large autonomous system as a number of smaller regions. Typically, routers within a given region only know the detailed topology of the network within their region, know how to get to other regions, and know the addresses of nodes contained in the other regions (or just those nodes contained in a backbone area). Thus, hierarchical routing techniques serve to reduce the complexity of routers by shielding the complexity of the network beyond a router's region. The cost, however, of this reduced complexity is that globally shortest paths are not necessarily determined.

Referring to the autonomous system 150 of FIG. 1, the OSPF interior gateway protocol may divide the autonomous system 150 into a number of areas 154, each of which is connected with a backbone area 152. Routers can be classified as follows. "Internal routers" are wholly within one area (See, e.g., routers 153, 160.), "area border routers" connect two or more areas (See, e.g., router 158.), "backbone routers" are in the backbone (See, e.g., router 153.), and "AS boundary routers" neighbor routers in other autonomous systems (See, e.g., routers 112 and 156.). Notice that a given router may belong to more than one class.

§ 4.1.2 Exemplary Network Node

Figure 2:
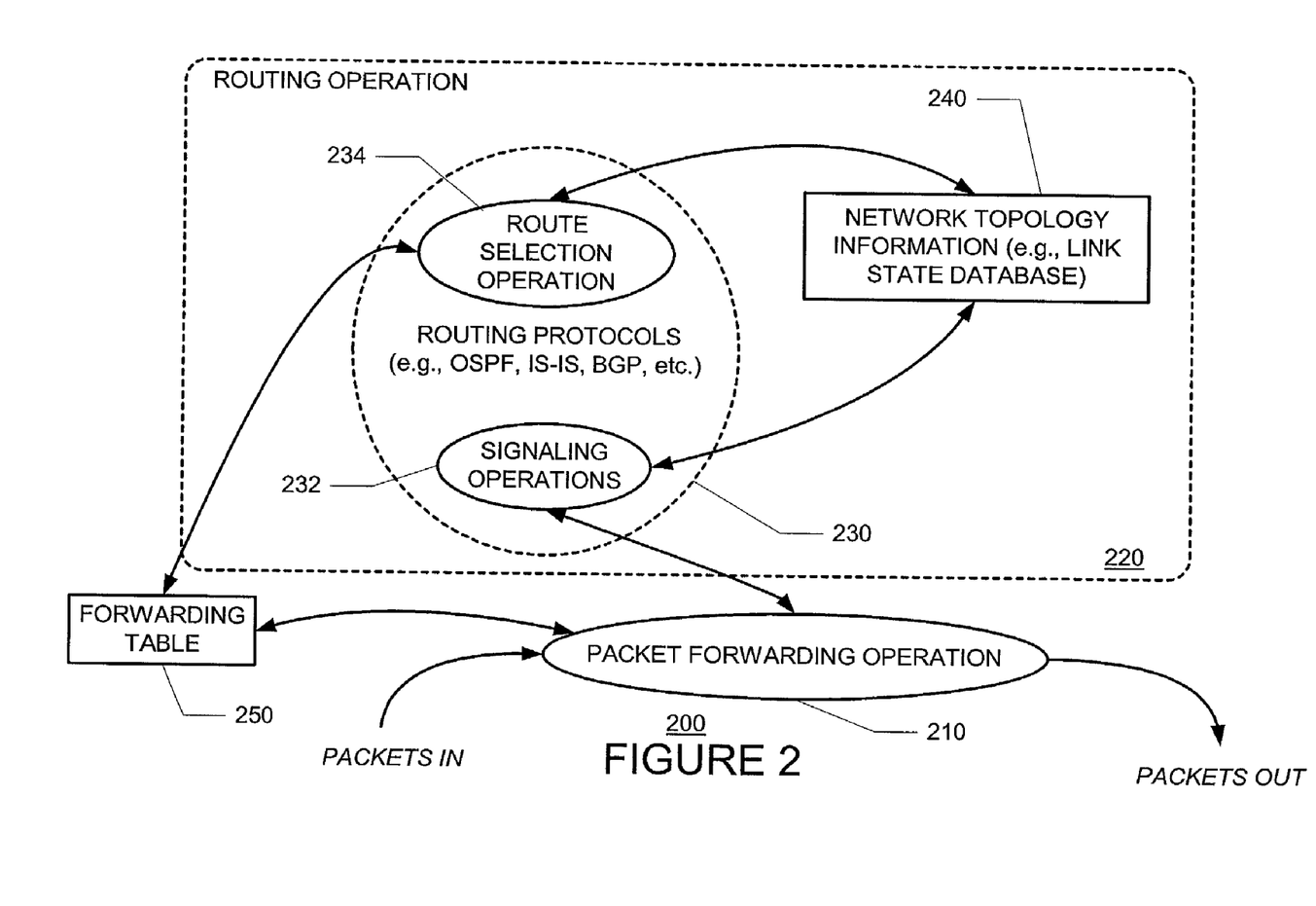
FIG. 2 is a process bubble diagram of an exemplary node that may be used in the internet of FIG. 1, and in which the present invention may operate.

FIG. 2 is a process bubble diagram of a router 200. The router 200 may include a packet forwarding operation 210 and a routing operation 220.

The routing operation 220 may include routing protocol operations 230 for effecting routing. These routing protocol operations 230 may include a signaling operation(s) 232 for accepting network information, maintaining network topology information (e.g., a link state database) 240, and disseminating network information. These operations 230 may also include a route selection operation 234 for selecting a route (e.g., open shortest path first) based on the network topology information 240, and for generating (routing information and) forwarding information 250.

Figure 10:
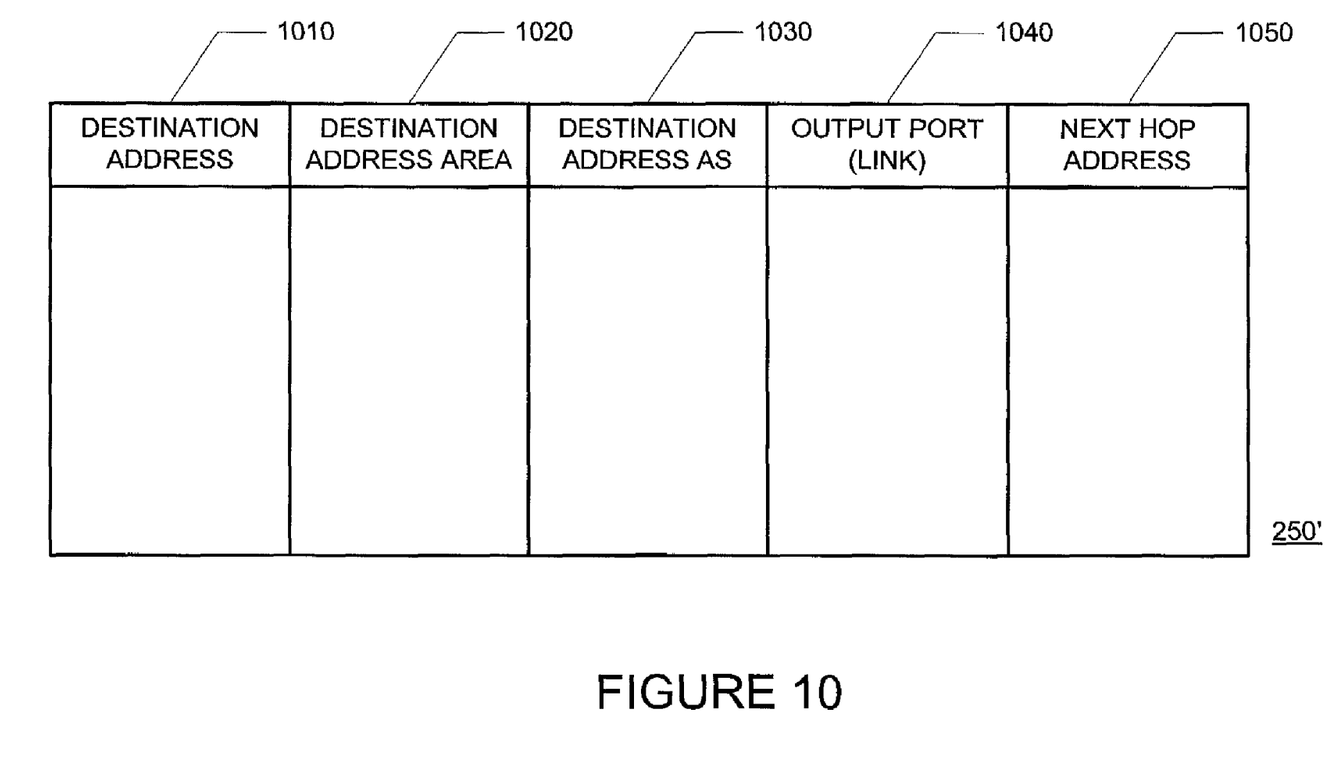
FIG. 10 is an exemplary table data structure for storing forwarding information.

The packet forwarding operation 210 may forward inbound packets based on information in the forwarding table 250. FIG. 10 is an exemplary table 250' that illustrates information that may be included in a packet forwarding table 250. As shown in FIG. 10, the exemplary table 250' may include a column 1010 of global (e.g., layer 3) destination addresses, a column 1020 of areas in which the destination addresses are found (if the network is divided into areas), a column 1030 of autonomous systems in which the destination addresses are found (if there is more than one autonomous system), a column 1040 of output ports (e.g., outgoing links) for directing packets received at the router towards their destination, and a column 1050 of the address(es) of the next hop(s) (e.g., layer 2 destination address(es)) in the packets' route towards the global destination address.

Briefly stated, the router observes the global (e.g., layer 3) destination address of the packet, determines the next hop (e.g., layer 2) destination address needed to forward the packet towards its ultimate destination, changes the layer 2 destination address of the packet, and places the updated packet on the corresponding output port (outgoing link). Some routers support other modes (e.g., tunneling, label-switched paths, etc.) of forwarding packets.

To address (hardware and/or software) routing failures, some network nodes include redundant routing operations that share a single forwarding operation (which may itself include redundant forwarding operations). For example, as illustrated in the process bubble diagram of FIG. 3, some nodes may include redundant routing operations (also referred to as "routing engines" or "REs" without loss of generality) 220a' and 220b'. Both routing operations 220a' and 220b' may maintain their own network topology information 240a' and 240b', respectively, and both may accept and disseminate network state information. However, only one routing operation 220a' or 220b' will be used to generate forwarding information used to populate the forwarding table 250'. This routing operation 220a' or 220b' may be referred to as a designated routing engine (or "DRE") below, without loss of generality. A routing engine designator 305 may be used to select the designated routing engine (DRE), for example based on an accepted designated routing engine selection signal. The other(s) routing engine(s) may be referred to as a "standby" routing engine(s).

§ 4.2 FUNCTIONS THAT MAY BE PERFORMED BY THE PRESENT INVENTION

The present invention may function to define new routing protocols, or to extend known routing protocols, such as BGP and IS-IS for example, to consider and accommodate nodes with redundant routing engines. The present invention may function to replicate network state information used by a routing protocol so that, in the event of failover, a newly designated routing engine does not need to establish new connections and learn network state information "starting from scratch" (which may take on the order of 20 minutes in a complex ISP network).

In the context of a path vector, exterior gateway routing protocol, such as BGP for example, the present invention may operate to (i) allow nodes with redundant routing engines to advertise that fact (e.g., using a "redundancy router identifier") to other nodes, (ii) allow nodes to signal which of a plurality of routing engines is its current designated routing engine, (iii) allow remote nodes to distinguish information sent by a designated routing engine from information sent by a standby routing engine(s), and/or (iv) allow remote nodes to handle all paths advertised, but to not use paths advertised by a standby routing engine(s) of a redundancy router. Further, in the event that the designated routing engine fails, the present invention may operate to (i) have the node (e.g., the "redundancy router") select a new designated routing engine, (ii) signal to external (e.g., peering) nodes the new designated routing engine, and (iii) have external nodes update their route information database (e.g., "RIB") to reject paths learned from the former designated routing engine and to accept paths learned from the new designated routing engine.

In the context of a link state, interior gateway protocol, such as IS-IS for example, the present invention may operate to modify the protocol for use by the designated routing engine and for use by a standby routing engine. More specifically, for the designated routing engine, the present invention may (i) execute the protocol as usual, and (ii) provide a copy of its network topology information (e.g., link state database) to the standby routing engine(s). For the standby routing engine(s), the present invention may operate to execute the protocol based on the network topology information received from the designated routing engine, and/or from external nodes consequent to executing the protocol (e.g., multicast on a control plane within the router), but to suppress signaling from the standby routing engine(s) to external node(s).

§ 4.3 EXEMPLARY OPERATIONS, ARCHITECTURE, METHODS AND DATA STRUCTURES

In the following, operations which may be performed by the present invention are introduced in § 4.3.1 below. Then, architecture, methods and data structures which may be used to effect these processes are described in § 4.3.2.

§ 4.3.1 OPERATIONS

Figure 3:
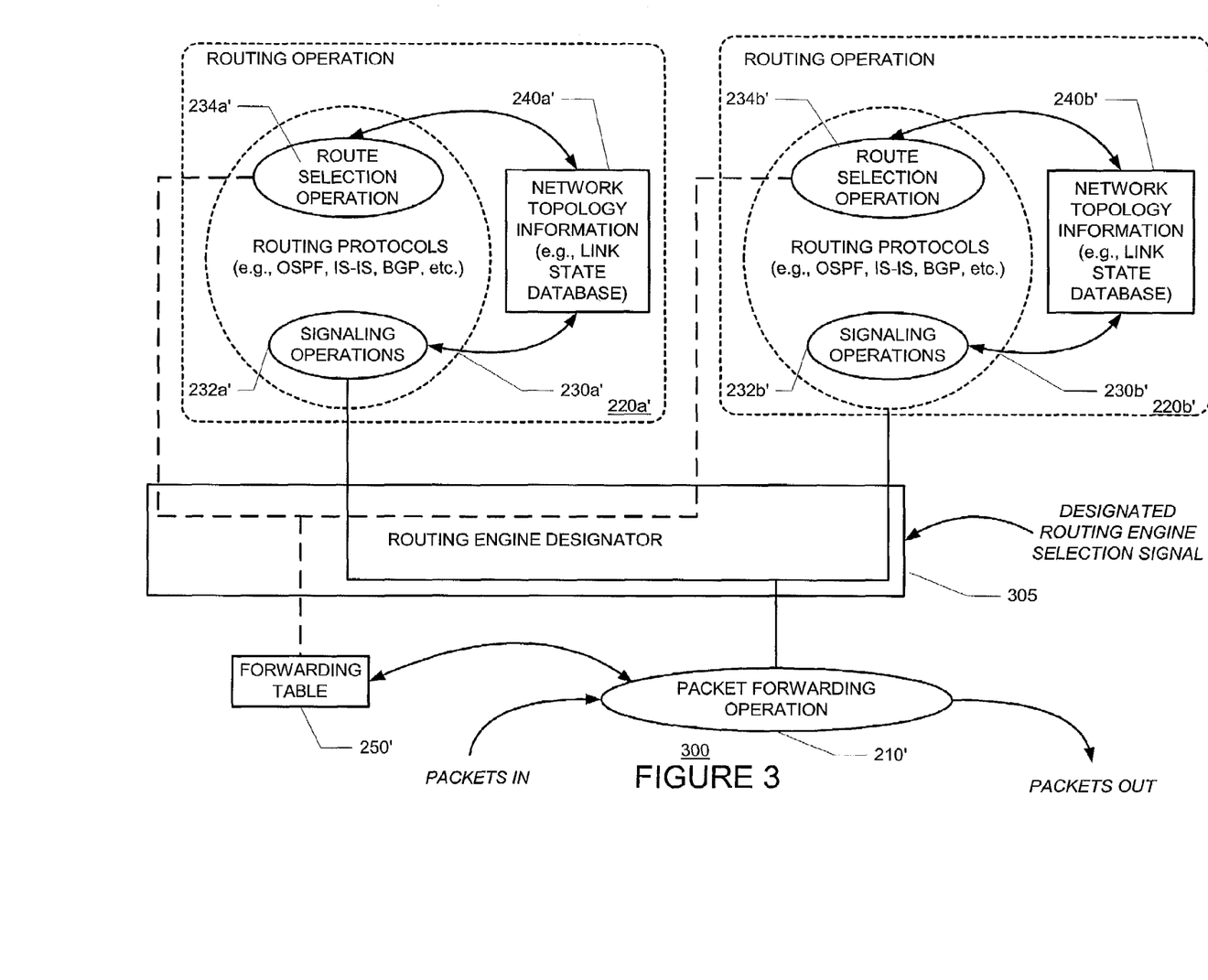
FIG. 3 is a process bubble diagram of an exemplary node including redundant routing facilities.

The present invention may operate in network nodes, such as those illustrated in FIGS. 2 and 3, to extend routing protocol operations to effect one or more of the functions introduced in § 4.2 above.

§ 4.3.2 EXEMPLARY EMBODIMENT(S)

Exemplary systems on which the functions introduced in § 4.2 above may be effected are described in § 4.3.2.1 below. Then exemplary methods that may be used to effect these functions, and exemplary data structures that may be used by these methods, are described in § 4.3.2.2 below.

§ 4.3.2.1 Exemplary Architectures

Figure 4:
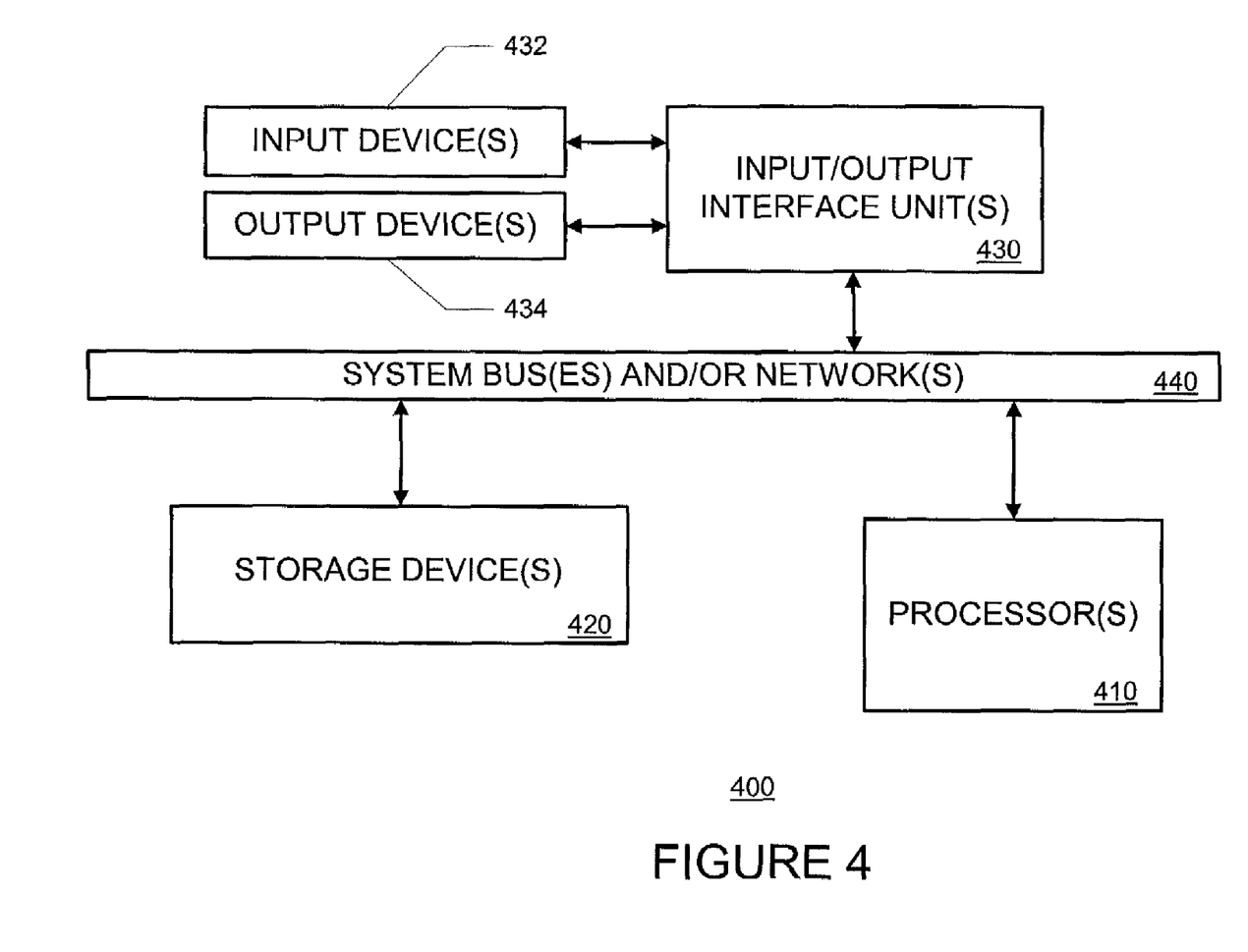
FIG. 4 is a high-level block diagram of an apparatus that may be used to effect various aspects of the present invention.

FIG. 4 is high-level block diagram of a machine 400 which may effect one or more of the processes discussed above. The machine 400 basically includes a processor(s) 410, an input/output interface unit(s) 430, a storage device(s) 420, and a system bus(es) and/or a network(s) 440 for facilitating the communication of information among the coupled elements. An input device(s) 432 and an output device(s) 434 may be coupled with the input/output interface(s) 430. Operations of the present invention may be effected by the processor(s) 410 executing instructions. The instructions may be stored in the storage device(s) 420 and/or received via the input/output interface(s) 430. The instructions may be functionally grouped into processing modules.

The machine 400 may be a router for example. In an exemplary router, the processor(s) 410 may include a microprocessor, a network processor, and/or (e.g., custom) integrated circuit(s). In the exemplary router, the storage device(s) 420 may include ROM, RAM, SDRAM, SRAM, SSRAM, DRAM, flash drive(s), hard disk drive(s), and/or flash cards. At least some of these storage device(s) 420 may include program instructions defining an operating system, a protocol daemon, and/or other daemons. In a preferred embodiment, the methods of the present invention may be effected by a microprocessor executing stored program instructions (e.g., defining a part of the protocol daemon). At least a portion of the machine executable instructions may be stored (temporarily or more permanently) on the storage device(s) 420 and/or may be received from an external source via an input interface unit 430. Finally, in the exemplary router, the input/output interface unit(s) 430, input device(s) 432 and output device(s) 434 may include interfaces to terminate communications links.

Naturally, the operations of the present invention may be effected on systems other than routers. Such other systems may employ different hardware and/or software.

§ 4.3.2.2 Exemplary Methods and Data Structures

Exemplary methods and data structures for effecting a link state routing protocol operation which considers and accommodates nodes with redundant routing engines are described in § 4.3.2.2.1 below with reference to FIG. 5. Then, exemplary methods and data structures for effecting a path or distance vector routing protocol operation which considers and accommodates nodes with redundant routing engines are described in § 4.3.2.2.2 below with reference to FIGS. 6 and 7.

Figure 5:
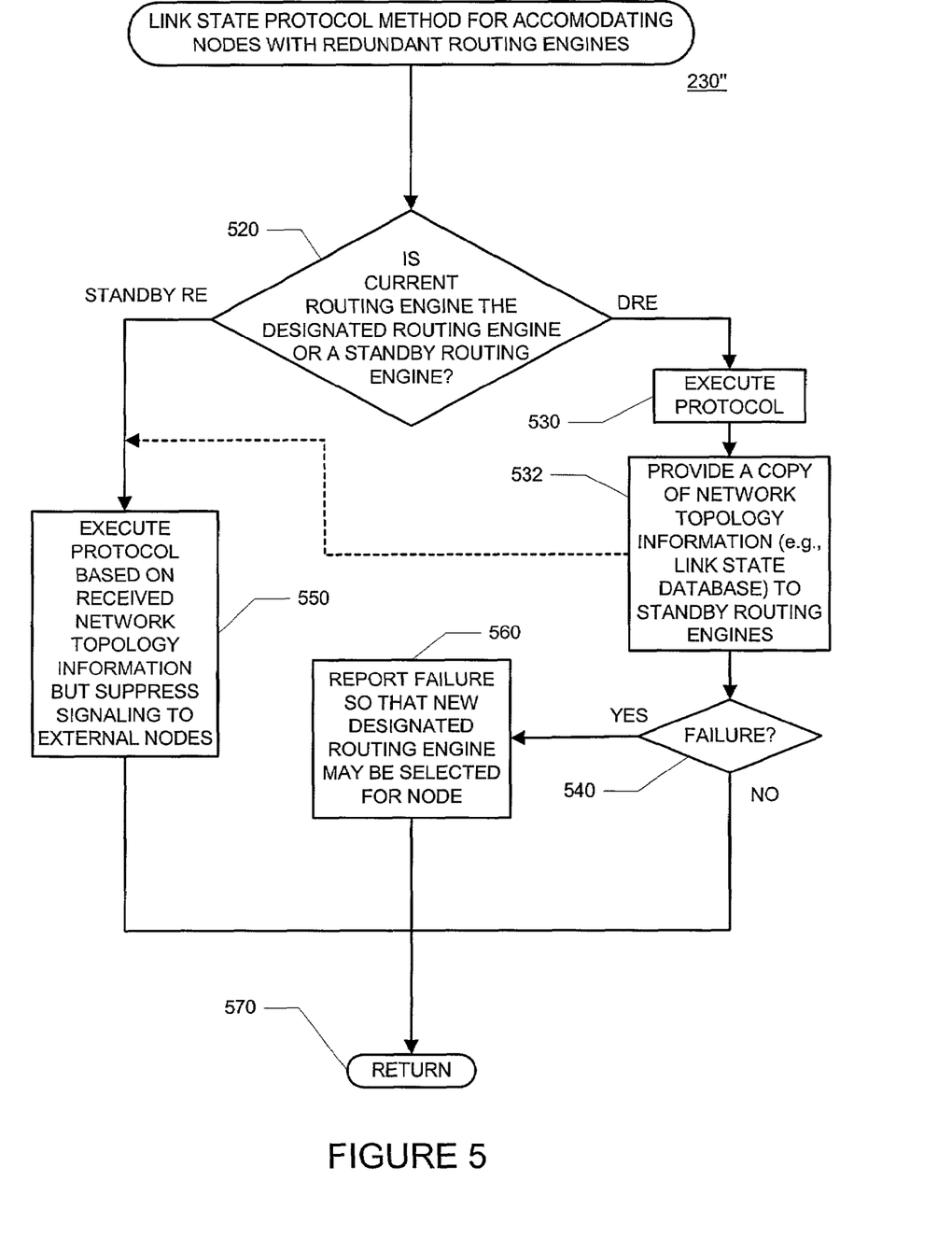
FIG. 5 is a high-level flow diagram of an exemplary method that may be used to effect a link state routing protocol which considers and accommodates nodes with redundant routing engines.

§ 4.3.2.2.1 Exemplary Link State Routing Protocols for Accommodating Nodes with Redundant Routing Engines FIG. 5 is a high-level flow diagram of an exemplary method 230" that may be used to effect a link state routing protocol which considers and accommodates nodes with redundant routing engines. This method 232", or individual instances thereof, may be run for each routing engine of a node. At decision branch point 520, it is determined whether the routing engine is the designated routing engine, or merely a standby routing engine.

If it is determined that the routing engine is the designated routing engine, then the protocol (e.g., IS-IS) is executed as usual as indicated by block 530. Further, as indicated by block 532, a copy of the network topology information (e.g., a link state database) generated and/or link state (packet) information received by the designated routing engine, is provided to each of the standby routing engines. Furthermore, if the designated routing engine fails, such a failure is reported to the node (e.g., the redundancy router) so that a new one can be selected, as indicated by decision branch point 540 and block 560. In any event, the method 230" may then be left via RETURN node 570.

Referring back to decision branch point 520, if it is determined that the routing engine is a standby routing engine, then, as indicated by block 550, the routing operations are executed based on the received (from the designated routing engine) network topology and/or network state information. As block 550 further indicates, signaling from the standby routing engine to external nodes is suppressed. Thus, external nodes need not know of the existence of the standby routing engine(s) (though knowledge of the standby router may be needed in certain instances, such as if a non-link state solution is used). The method 232" may then be left via RETURN node 570.

In the context of the IS-IS link state protocol, the method may operate to (i) generate constrained shortest path first ("CSPF") protocol data units ("PDUs") (e.g., on a control plane) for the designated routing engine ("DRE"), (ii) drop the IS-IS Hellos ("IIHs") generated by the standby routing engine(s) before they are actually transmitted, (iii) suppress link state packet(s) ("LSP") and complete sequence number packet ("CSNP") transmissions by the standby routing engine(s), and/or suppress partial sequence number packet ("PSNP") transmissions for all interfaces, except the control plane, for the standby routing engine(s).

In the extension to the IS-IS protocol, note that the state of the system is not affected. Further, since both the designated routing engine and the standby routing engine(s) use the same domain-unique system identifier ("sysid") and the same subnet point of attachments ("SNPAs") (e.g., media access control or MAC addresses), adjacencies (to external nodes) should come up on the standby routing engine(s), even though no adjacency actually exists.

In the extension to the IS-IS protocol, state transfer to the standby routing engine(s) may be accomplished by having the designated routing engine perform flooding on the redundancy router's control plane (e.g., run on an internal Ethernet of the node). In effect, the designated routing engine is elected as the designated intermediate system ("DIS") and uses CSPN PDUs to transmit its network topology (e.g., link state database) state. The standby routing engine(s) is free to use PSNP PDUs to insure that it has a complete set of LSPs.

Since there is a chance that the standby routing engine(s) may generate an LSP that differs from that of the designated routing engine, either in content or in sequence number, it may be desired to modify the LSP generation code so that the standby routing engine(s) simply accepts LSPs that appear to have its own system identifier ("sysid"). In the event of a failover, full LSP generation should be triggered on the newly selected designated routing engine. At failover, the newly designated routing engine may take on the identity (e.g., Layer 2 (MAC) address in the case of IS-IS failover) of the former designated routing engine.

Figure 6:
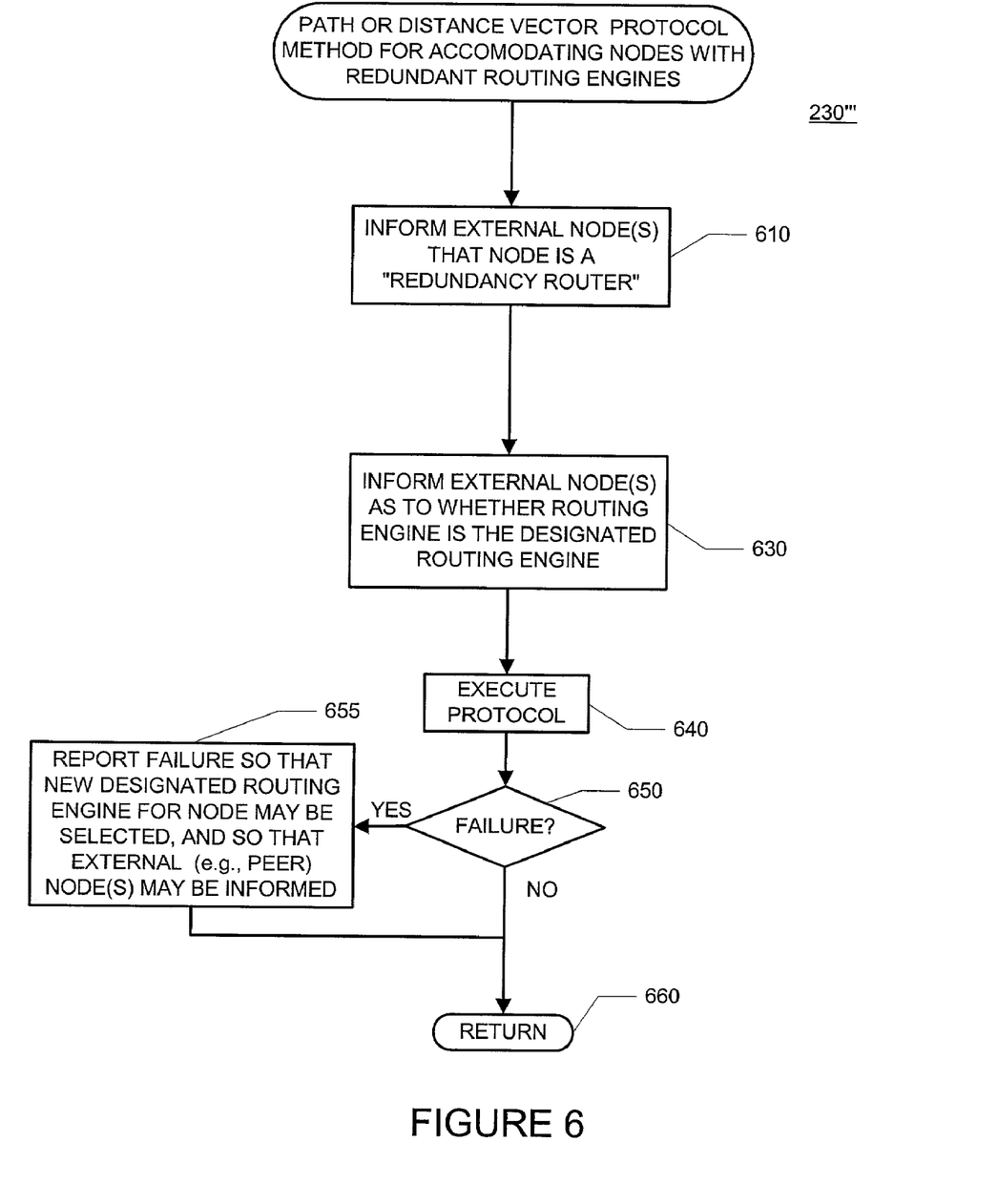
FIGS. 6 and 7 are high-level flow diagrams of exemplary methods that may be used to effect a path or distance vector routing protocol which considers and accommodates nodes with redundant routing engines.
Figure 7:
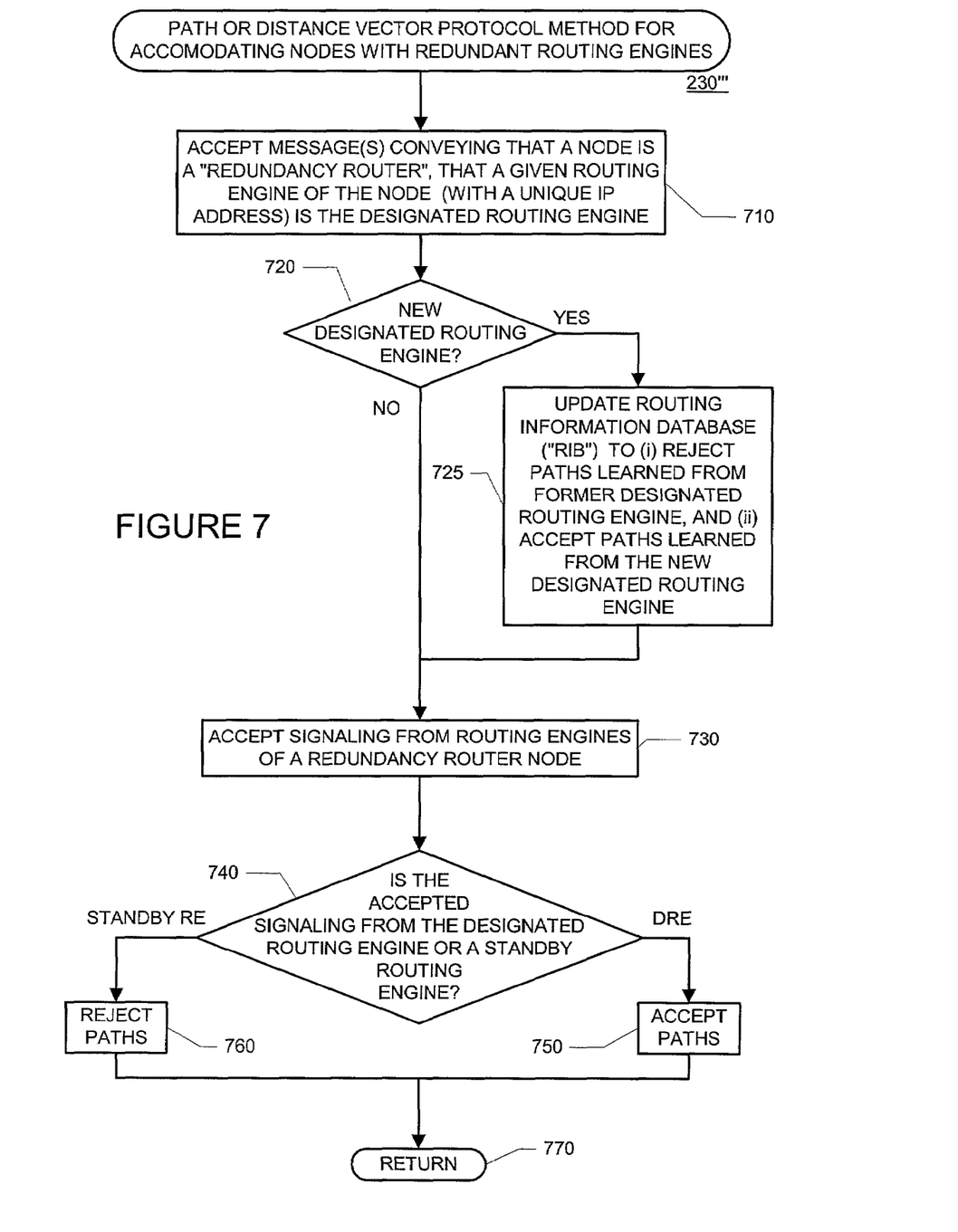

§ 4.3.2.2.2 Other Exemplary Protocols, Including Path and Distance Vector Routing Protocols for Accommodating Nodes with Redundant Routing Engines FIGS. 6 and 7 are high-level flow diagrams of exemplary methods that may be used to effect a path (or distance) vector routing protocol which considers and accommodates nodes with redundant routing engines. More specifically, FIG. 6 illustrates a method that may be performed by a node with redundant routing engines, while FIG. 7 illustrates a method that may be performed by a node interacting (e.g., peering) with a node with redundant routing engines, regardless of whether or not the node performing the method itself has redundant routing engines.

The method 230''' illustrated in FIG. 6, or instances thereof, may be performed by individual routing engines of the node. It is conceivable, however, that some acts of the method 230''' may be centrally performed by the node. As indicated by block 610, the node (e.g., using each of its routing engines) may inform an external node(s) that the node is a "redundancy router". As indicated by block 630, the routing engine informs an external node(s) as to whether it is the designated routing engine. Alternatively, the node may, itself, identify its designated routing engine to an external node(s) using a centralized signaling operation. As indicated by block 640, the routing protocol is executed by each routing engine as it would normally be executed otherwise. Finally, as indicated by decision branch point 650 and block 655, if the designated routing engine fails, such a failure is reported so that the redundancy node may select a new designated routing engine and so that external nodes (e.g., peers) may be informed of the new designated routing engine.

Referring now to FIG. 7, a node interacting (e.g., peering) with a node having redundant routing engines ("the redundancy router") may accept a message or messages conveying that the external node is a "redundancy router", and that a given routing engine of the node (e.g., having a unique IP address) is the designated routing engine, as indicated by block 710. The node may accept further signaling from the routing engines of the redundancy router node as indicated by block 730. As indicated by decision branch point 740, it is determined whether the accepted signaling is from the designated routing engine or from a standby routing engine. If the signaling is from the designated routing engine, any paths signaled are accepted as indicated by block 750. If, on the other hand, the signaling is from a standby routing engine, any paths signaled are rejected as indicated by block 760. Such rejected paths may, however, be stored (but not immediately used). Such storage may be considered important if it cannot be assumed that each of the redundant routing engines are synchronized. If, however, it can be assumed that the redundant routing engines are synchronized, then (rejected) paths from the standby routing engine(s) needn't be stored (although the failover should be signaled).

Notice also that if a message indicating a new designated routing engine is received, the node will update its routing information (e.g., its "RIB") to reject paths learned from the former designated routing engine and to accept paths learned from the new designated routing engine (via new messages or using stored, but previously rejected, paths), as indicated by decision branch point 720 and block 725.

In the context of the BGP protocol, a new message operation code that can be used by routing engines to indicate to the remote node (e.g., a peer) that it has been elected as the designated routing engine may be negotiated using BGP capabilities negotiation. The routing engines that share the same forwarding hardware are assigned the same redundancy router identifier. This redundancy router identifier may be chosen dynamically through router election to be the router ID of one of the system in the group. Alternatively, this redundancy router identifier may be statically configured. In either case, the remote node may use the redundancy router identifier to dynamically determine the set of neighbors that are in a particular routing engine redundancy group.

In the extension to the BGP protocol, a routing engine may send a DESIGNATED_ROUTER message once it is chosen as the designated routing engine. The DESIGNATED_ROUTER message may include an election number. The election number may indicate which router election event caused it to determine it to be the designated routing engine. The election number may be incremented (e.g., by one) by the routing engine each time a reelection occurs. All routing engines should agree on a single designated routing engine before a given election pass is complete.

In the extension to the BGP protocol, the remote node (e.g., peer) may treat all BGP paths advertised by the standby routing engine(s) as though they were rejected by import policy. When the remote node learns of a new designated routing engine (e.g., through a DESIGNATED_ROUTER message), it may update its routing information database ("RIB") to reject the paths learned from the former designated routing engine and to accept the paths learn from the newly elected designated routing engine. During this change, any route damping figure of merits should not be increased. Thus, the remote node may be configured to peer with all of the routing engines of a redundancy router. Each routing engine in the redundancy group may share the same local and remote autonomous system ("AS") numbers. The redundant routing engines may be assigned unique IP addresses for peering purposes. Thus, the remote node does not need to be explicitly configured to know the set of routing engines that form the redundancy group. Each routing engine in the redundancy group may share identical BGP configurations, except for the local IP address used for peering purposes. The redundancy router identifier may be configured on each of the redundant routing engines (e.g., in a routing-options section command of a node with the JUNOS operating system from Juniper Networks). This part of the configuration may also be shared.

§ 4.4 EXAMPLES OF OPERATIONS IN AN EXEMPLARY EMBODIMENT

Figure 8:
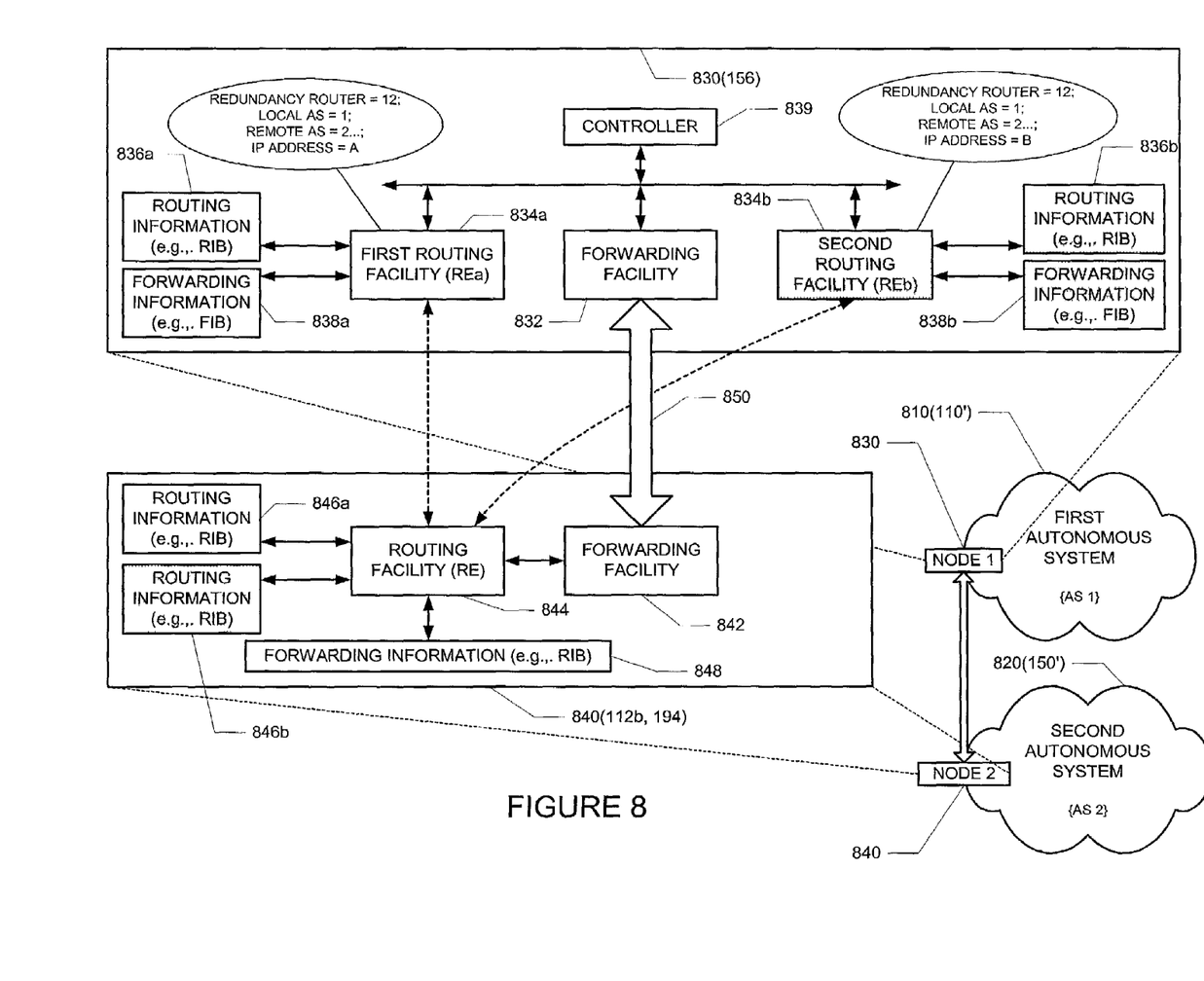
FIG. 8 is a high-level block diagram illustrating a peering between two nodes in two different autonomous systems.

FIG. 8 is a high-level block diagram illustrating a peering between two nodes 830 and 840 in two different autonomous systems 810 and 820. (Recall, for example, nodes 156 and 112b, 194 and autonomous systems 110' and 150' in FIG. 1.) In the following example, it is assumed that the peering takes place using a path vector routing protocol, such as BGP for example. It is further assumed that the first node 830 has a forwarding facility 832, multiple routing facilities 834, each routing facility having associated routing information 836 and forwarding information 838, and a controller 839 which, among other things, may select a designated routing facility (or "engine"), and may perform system or node level signaling. Further, each routing facility 834 may share a common redundancy router identifier, as well as local and remote autonomous system identifiers, but each 834 may have its own layer 3 (e.g., IP) address. The second node 840 has a forwarding facility 842, a routing facility (or "engine") 844, associated routing information 846a (and 846b), and forwarding information 848. The second set of routing information 846b needn't be stored if it can be assumed that the redundant routing engines 834 are synchronized, in which case the routing information 846b would be the same as the routing information 846a.

The nodes 830 and 840 are coupled via a physical link 850 (e.g., facilitating optical, electrical, and/or wireless communications), or a multi-hop path (e.g., BGP peering). Logical communications are denoted with dashed lines, even though such communications occur via the physical link 850.

Figure 9:
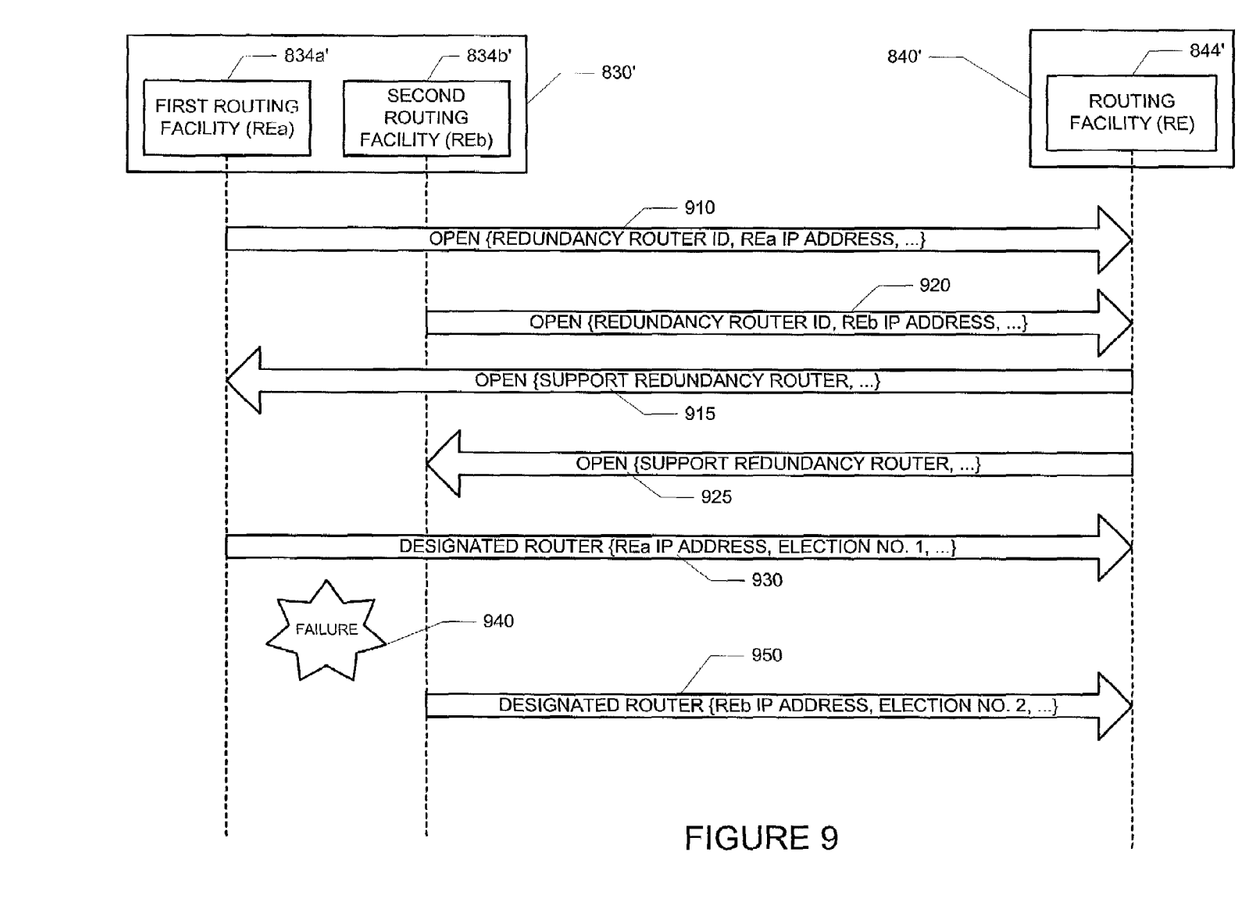
FIG. 9 is a messaging diagram illustrating a peering session between a two nodes, at least one having redundant routing facilities.

FIG. 9 is a messaging diagram illustrating a peering session between two nodes, at least one having redundant routing facilities. (See, e.g., the nodes 830 and 840 of FIG. 8.) So-called "NOTIFICATION" and "KEEPALIVE" BGP messages are not shown in order to simplify the drawing. Operations of the first node 830', operating in accordance with the method illustrated in FIG. 6, and operations of the second node 840', operating in accordance with the method of FIG. 7, are illustrated.

Referring to both block 610 and communications 910 and 920, the first node 830', and more specifically, each of the routing facilities 834' of the first node 830, may inform the second node 840' that it (i.e., the first node 830') is a "redundancy router" in "OPEN" messages 910 and 920. The "BGP identifier" parameter of a BGP "OPEN" message may include the router identifier (12) shared by the REs. The "option data" parameter of a BGP "OPEN" message may indicate that the routing engine is a part of a redundancy router. The second node 840' may send its own "OPEN" messages 915 and 925 in which it indicates that it supports a protocol supporting nodes with redundant routing facilities, such as a protocol described by the present invention. Such an indication may be carried in the "option data" parameter of a BGP "OPEN" message.

In this example, the first routing facility 834a' has be selected, by whatever means, as the designated routing engine. This fact is communicated to the second node 840' as indicated by the "DESIGNATED_ROUTER" communication 930. (Recall, e.g., block 630 of FIG. 6.) Recall that this communication may include an election number.

Recall from block 750 of FIG. 7 that the remote (e.g., peer) node will accept paths from the designated routing engine. Such paths may be included in BGP "UPDATE" messages. These messages are not shown in order to simplify FIG. 9.

At some point, the designated routing engine may fail, as indicated by event 940. In such an event, it is assumed that the second routing facility 834b' is elected, by whatever means, as the new designated routing engine. This fact is communicated to the second node 840' as indicated by the second "DESIGNATED_ROUTER" communication 950. (Recall, e.g., block 630 of FIG. 6.) Recall that this communication may include an election number, which should be larger than the election number in the previous "DESIGNATED_ROUTER" communication 930. Recall from FIG. 7 that the remote (e.g., peer) node will now reject the paths from the former designated routing engine, and will now accept the (new and/or previously rejected, but stored) paths from the newly elected designated routing engine. Again, such paths may be included in BGP "UPDATE" messages. These messages are not shown in order to simplify FIG. 9.

§ 4.4 CONCLUSIONS

In view of the foregoing, the present invention helps to make a network more robust by maintaining a routing state between redundant routing engines. Further, the present invention provides routing protocols (or extends existing routing protocols) to consider and accommodate such nodes having redundant routing engines. By optionally limiting signaling by a standby router(s), but providing copies of network topology information from a designated routing engine to a standby routing engine(s), the present invention may provide a link state protocol that is robust and that provides relatively quick convergence in the event that the designated routing engine fails. By optionally ignoring paths signaled by a standby router(s), the present invention may provide a path or distance vector routing protocol that is similarly robust and that provides relatively quick convergence in the event that the designated routing engine fails.

What is claimed is:

1. For use in a router adapted to interact with an external router having, at a given time, a currently designated routing facility and a current standby routing facility, a method comprising:
   a) accepting, from the external router, the identity of the currently designated routing facility;
   b) accepting, from the currently designated routing facility of the external router when it is in a state of being the designated routing facility, network information;
   c) using the network information accepted from the currently designated routing facility of the external router for determining routes; and
   d) accepting, from the current standby routing facility of the external router when it is in a state of being the standby routing facility, network information, but not using it for determining routes.

2. The method of claim 1 further comprising:
   e) storing the network information accepted from the current standby routing facility of the external router.

3. The method of claim 2 further comprising:
   f) accepting, from the external router, an indication that the currently designated routing facility has failed;
   g) accepting, from the external router, an indication that the formerly current standby routing facility has been elected as a new designated routing facility; and h) using the network information from the formerly current standby routing facility that is now the newly elected new designated routing facility.

4. The method of claim 1 further comprising:

e) accepting, from the external router, an indication that the currently designated routing facility has failed;

f) accepting, from the external router, an indication that the formerly current standby routing facility has been elected as a new designated routing facility; and g) using path information from the newly elected new designated routing facility.

5. A machine-readable medium having machine readable instructions stored thereon which, when executed by a machine, effect the method of claim 1.

6. The method of claim 1 wherein the router and the external router belong to different autonomous systems.

7. A router adapted to interact with an external router having, at a given time a currently designated routing facility and a current standby routing facility, the router comprising:

a) an input for i) accepting, from the external router, the identity of the currently designated routing facility, and ii) accepting, from the currently designated routing facility of the external router when it is in a state of being the designated routing facility, network information; and b) a routing facility for i) using the network information accepted from the currently designated routing facility of the external router for determining routes, and ii) accepting, from the current standby routing facility of the external router when it is in a state of being the standby routing facility, network information, but not using it for determining routes.

8. The router of claim 7 further comprising:

c) a storage device for storing the network information accepted from the current standby routing facility of the external router.

9. The method of claim 8 wherein the input is further adapted for iii) accepting, from the external router, an indication that the currently designated routing facility has failed, and iv) accepting, from the external router, an indication that the formerly current standby routing facility has been elected as a new designated routing facility, and wherein the routing facility is further adapted to use the network information that was accepted from the formerly current standby routing facility and that was stored, if it is newly elected as the new designated routing facility.

10. The router of claim 7 wherein the input is further adapted for iii) accepting, from the external router, an indication that the currently designated routing facility has failed, and iv) accepting, from the external router, an indication that the formerly current standby routing facility has been elected as a new designated routing facility, and wherein the routing facility is further adapted to use path information from the newly elected new designated routing facility when the input accepts the indication that the formerly current standby routing facility has been elected as the new designated routing facility.

11. The router of claim 7 wherein the router and the external router belong to different autonomous systems.

* * * * *